United States Patent [19]

Bolton et al.

[11] Patent Number: 4,799,346

[45] Date of Patent: Jan. 24, 1989

[54] LAMINATED GLAZING UNIT

[75] Inventors: Nelson P. Bolton, Quakertown; W. Novis Smith, Jr., Philadelphia, both of Pa.

[73] Assignee: Advanced Glass Systems Corp., Trumbauersville, Pa.

[21] Appl. No.: 886,301

[22] Filed: Jul. 16, 1988

[51] Int. Cl.$^4$ .............................. E04C 1/40
[52] U.S. Cl. ............................ 52/509; 52/511; 52/587; 52/813; 428/441
[58] Field of Search ............... 52/305, 509, 511, 583, 52/587, 787–789, 811, 813, 821, 309.2; 428/437, 83, 441

[56] References Cited

U.S. PATENT DOCUMENTS

| | | | |
|---|---|---|---|
| 581,940 | 5/1897 | Pelton | 52/509 |
| 2,244,489 | 6/1941 | Downes . | |
| 2,310,402 | 9/1943 | Dennison . | |
| 2,322,582 | 6/1943 | Marini . | |
| 2,326,203 | 8/1943 | Dennison | 52/208 |
| 2,348,307 | 5/1944 | Richardson | 52/788 |
| 2,369,382 | 2/1945 | Watkins | 52/398 |
| 2,381,194 | 8/1945 | Watkins | 52/789 |
| 2,408,483 | 10/1946 | Rodman | 52/789 |
| 2,567,353 | 9/1951 | Ryan | 52/208 |
| 2,696,451 | 12/1954 | Snyder | 428/83 |
| 2,784,926 | 3/1957 | Bonza et al. | 52/309.1 X |
| 3,258,115 | 6/1966 | Mucaria . | |
| 3,388,032 | 6/1968 | Saunders . | |
| 3,458,388 | 7/1969 | Moynihan . | |
| 3,616,122 | 10/1971 | Orcutt . | |
| 3,622,440 | 11/1971 | Snedeluer . | |
| 3,871,151 | 3/1975 | Der Estephanian | 52/507 |
| 4,321,777 | 3/1982 | Sauret et al. . | |

FOREIGN PATENT DOCUMENTS

| | | | |
|---|---|---|---|
| 544862 | 2/1956 | Belgium | 52/583 |
| 702410 | 1/1941 | Fed. Rep. of Germany | 52/308 |
| 2572766 | 5/1986 | France | 52/788 |

Primary Examiner—John E. Murtagh
Assistant Examiner—Andrew Joseph Rudy
Attorney, Agent, or Firm—Steele, Gould & Fried

[57] ABSTRACT

A laminated glazing unit having outer sheets of glass or plastic and at least one resinous interlayer bonding the outer layers together. The unit is provided with an attachment member embedded in the interlayer free from contact with the outer sheets for attachment to a support structure.

18 Claims, 2 Drawing Sheets

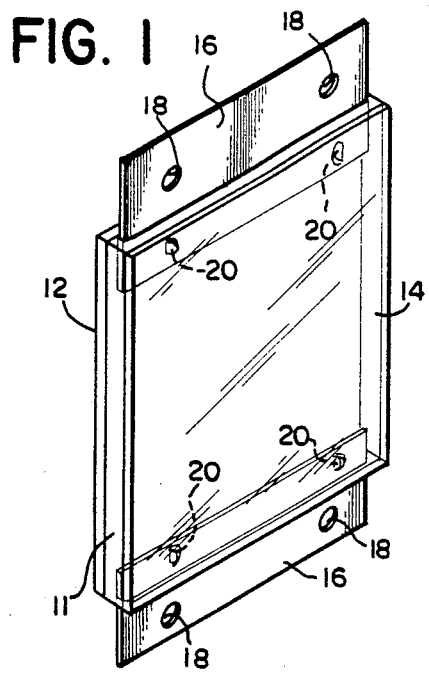
FIG. 1
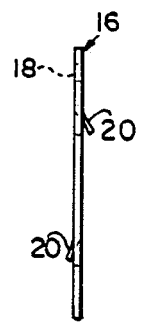
FIG. 2A
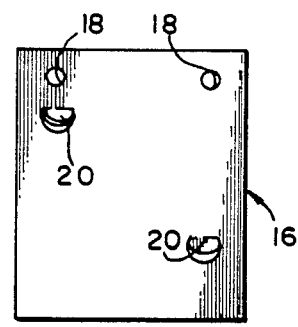
FIG. 2B
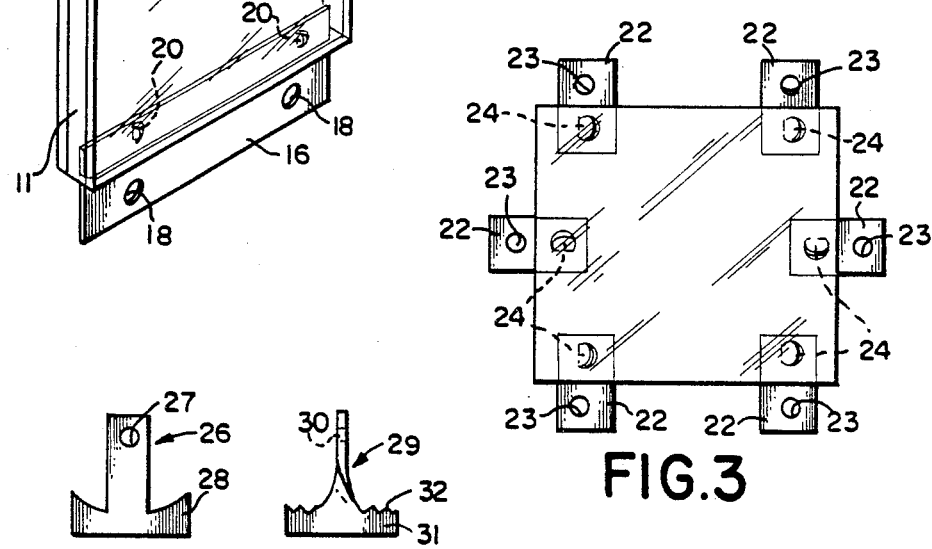
FIG. 3
FIG. 4A  FIG. 4B
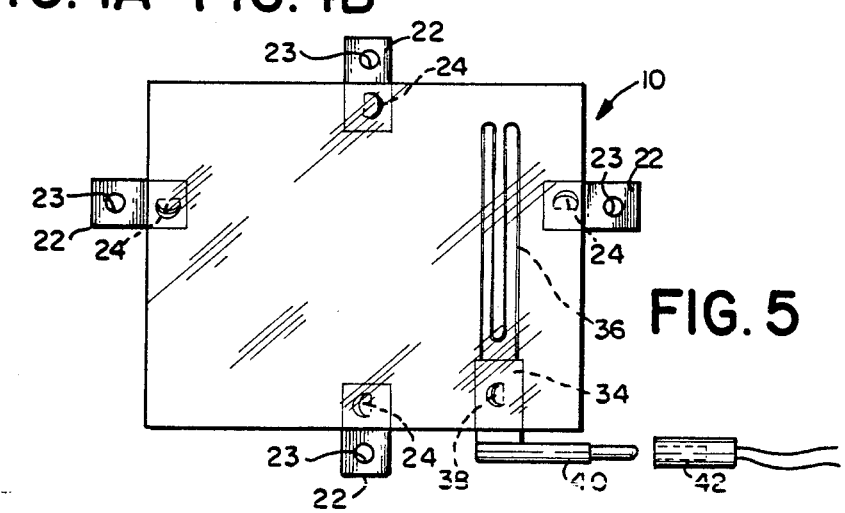
FIG. 5

LAMINATED GLAZING UNIT

BACKGROUND OF THE INVENTION

The present invention relates to laminated safety glass glazing units of the type for security installations and for windshields of aircraft. More particularly, the present invention relates to a means for securing a laminated safety glass unit to a frame or other structural unit.

In detention and security facilities such as prisons, police stations, military compounds, banks, etc. transparent laminates having high resistance to impacts comprising at least one sheet of transparent plastic material interposed between sheets of glass or plastic material are being utilized in place of wall units or security bars. New types of plastics and glass have been developed for use in such laminates to prevent penetration by projectiles and/or various blunt instruments or devices. In this regard, there has been great advancement in preventing penetration of the protective structure by a direct attack on the laminate. However, little progress prior to the present invention has been made to overcome the breach of security through the removal of the laminate from the frame or structural member without directly attacking the laminate or to prevent delamination after the laminate has been fractured.

Windshields and canopies for aircraft have been constructed from laminates in order to withstand high energy impacts as by collision with a bird at high speeds. The laminates are usually mounted so as to transmit loads thereon directly to the frame of the aircraft. In a typical construction the outer plies are affixed to the airframe so that non-impact loads, for example, loads caused by pressurization, are also transmitted to the airframe. The securing of the laminates to the air frame whereby there is contact of the outplies with the metal of the aircraft or within the frame can cause stress cracks along the edges especially at low temperatures where elastomeric supports harden and shrink. Stress cracks can further occur by the use of bolt fasteners and clamping means directly on the out plies.

In both aircraft and security installations time is critical when the laminates are being subjected to stress and impact to prevent their complete removal from their frames or supporting structures. Merely bolting or clamping the laminates into a frame or supporting structure in some cases is not adequate to prevent their sudden removal after stress and impact and results in premature cracking along the peripheral areas even without the anticipated impact.

DESCRIPTION OF THE PRIOR ART

The art is replete with many types of safety glass laminates having an inner layer of resilient material disposed between two rigid sheets of glass and/or rigid plastic material.

It is known to embed in transparent laminates bus bars at the corners of windows to provide electrical contacts to heat the windows for defrosting or defogging. U.S. Pat. No. 4,029,942 to Levin, which is incorporated herein by reference, discloses one of such means. However, the techniques disclosed cannot be utilized as a means for providing a security fastening for the windows.

U.S. patent application Ser. No. 809,847 filed Dec. 17, 1985 of applicants, which is incorporated herein by reference, discloses preferred laminated safety glass systems for use in connection with the present invention.

U.S. Pat. No. 3,666,614 to Snedeker, which is incorporated herein by reference, discloses a laminated windshield having a plurality of polycarbonate sheets bonded together by polymeric adhesive interlayer material. No attachment means is included in this patent.

U.S. Pat. No. 3,388,032 to Saunders, which is incorporated herein by reference, discloses a glass polycarbonate laminate. Polyurethane is disclosed as interlayer material for adhering the polycarbonate ply to glass.

U.S. Pat. No. 3,681,167 to Moore, which is incorporated herein by reference, discloses a sheet of fused acrylic and polycarbonate which may be used as a protective layer in a laminated windshield.

U.S. Pat. No. 3,458,388 to Moynihan, which is incorporated herein by reference, discloses laminated windows having an interlayer comprising a central ply of polycarbonate and two relatively soft adhesive layers. The adhesive layers are composed of polyurethane.

U.S. Pat. No. 3,424,642 to Orcutt, which is incorporated herein by reference, discloses laminated glass-plastic windows containing interlayers which may extend beyond the edges of outer glass plies. The edge portion extending beyond the edges of the outer glass plies may contain one or more reinforcing frames or inserts that are securely mounted to a structural supporting frame.

U.S. Pat. No. 2,310,402 to Dennison, which is incorporated herein by reference, discloses a glass insulation unit of laminated glass wherein a metal border is embedded in the plastic interlayers.

SUMMARY OF THE INVENTION

According to the present invention, there is at least one securing means embedded within the interlayer material of the laminate glazing unit, preferably having resistance means which prevents its removal from the laminate. The securing means extends from the edge of the laminate for securing to a frame or building structure. The securing means also aids in distributing impact energy from the laminate to the frame or structure.

Although, the securing means of the invention can be utilized with many types of safety glass laminates advantageously, it has been found that a laminate having an inner layer of an ionomer resin, preferably an ionically cross-linked ethylene-methacrylic acid co-polymer, such as disclosed in said patent application Ser. No. 809,847, provides the greatest improvement in a laminate composite. A resistance means is not ordinarily required because of the ionomer's good adhesion to metal.

Where the laminate interlayer is polyurethane, poly (vinyl butyral), and the like, the resistance means helps to overcome the disadvantages of poor adhesion to metal and/or the presence of the embedded material which causes delamination.

Accordingly, it is an object of this invention to provide a means for securing a laminated safety glass glazing unit to a frame or other structural unit.

Another object of this invention is to improve the retention of the laminate in the frame or structural unit.

A further object of this invention is to provide a laminate for the windshields and canopies of aircraft which avoids some of the factors which results in stress cracks along the periphery.

It is a still further object of the invention to provide a laminate with means to resist delamination after the laminate has been fractured.

It is a yet still further object of the invention to provide a means for transferring impact energy away from the laminate and to a structure containing the laminate.

Other objects and a fuller understanding of the invention will be had by referring to the following description and claims of a preferred embodiment, taken in conjunction with the accompanying drawings, wherein like reference characters refer to similar parts throughout the several views.

BRIEF DESCRIPTION OF THE DRAWINGS

FIG. 1 is a perspective view of a laminate incorporating on form of securing means of the invention;

FIG. 2A is a side view of the securing means of FIG. 1;

FIG. 2B is a front view of the securing means of FIG. 1;

FIG. 3 is a front view of a laminate incorporating another form of securing means of the invention;

FIGS. 4A and 4B are views of other forms of securing means;

FIG. 5 is a front view of a laminate incorporating a securing means of the invention and an electrical contact means having a resistance means;

DESCRIPTION OF THE PREFERRED EMBODIMENTS OF THE INVENTION

Figure 6:
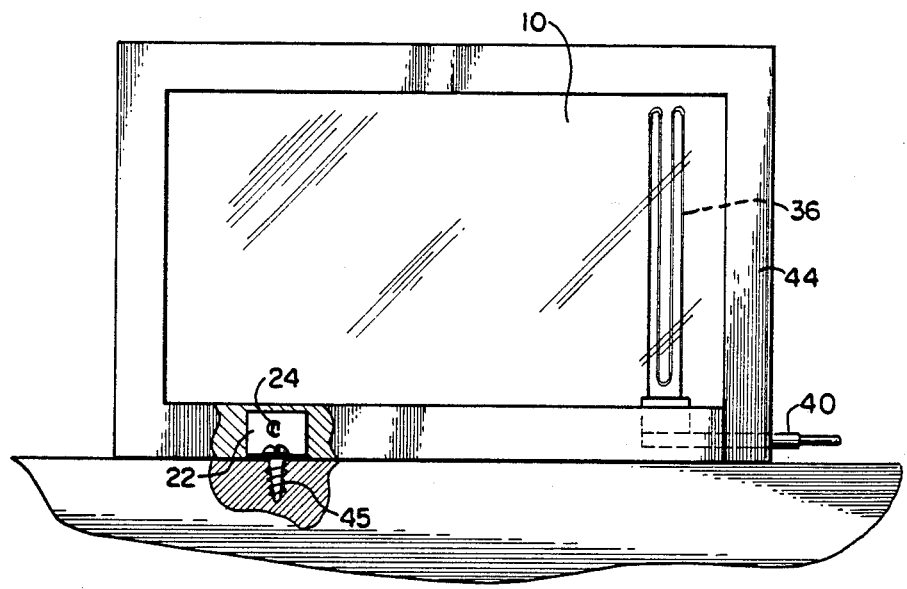
FIG. 6 is a front view partially in cross-section showing the laminate of FIG. 5 as attached to a frame.

Although specific terms are used in the following description for the sake of clarity, these terms are intended to refer only to the particular structure of the invention selected for illustration in the drawings, and are not intended to define or limit the scope of the invention.

It is understood that the following description omits many structural elements commonly found in laminating glazing units for aircraft, such as mounting frames, such as those in U.S. Pat. No. 3,081,205 to Shorr, electrical terminal blocks and special insulators for lead lines connecting bus bars for the defogging or deicing device of U.S. Pat. No. 3,410,739 to Orcutt, temperature sensing devices, such as those shown in U.S. Pat. No. 3,789,191 to Spindler, reinforcing frames such as those shown in the aforesaid Orcutt and Shorr patents and other structural elements well known in the art.

Referring to FIG. 1, a laminated glazing unit 10 is shown having an interlayer 11 which is transparent and outer sheets 12 and 14 bonded to the interlayer 11. Embedded within the interlayer 11 and extending along a periphery of the glazing unit 11 are securing or attachment members 16. The attachment members 16 are embedded within the interlayer 11 and are preferably provided with resistance means 20 which prevents removal of the attachment members. The resistance means 20 all assists in preventing delamination when the laminate glazing unit is secured to a frame or other structure and subjected to high impact force or stress. The attachment member 16 is further provided with holes 23 for bolting or nailing onto a frame or support structure. The attachment member 16 in some instances is around the entire periphery of the glazing unit and may comprise one continuous sheet.

The provision of a resistance means is particularly advantageous when the resinous interlayer has poor adhesion to metal and/or the laminate has a tendency to delaminate under impact or stress.

FIGS. 2A and 2B illustrate one form of securing or attachment means 16 which can be utilized in the invention. Although, it is shown as a separate insert for each side of the laminate 10, it may take the form of one continuous piece embedded along the laminate's periphery. The protrusions 20 as shown may be punched out at different sizes depending upon the nature of the interlayer 11 and the number of layers comprising the interlayer that the protrusions 20 are intended to cross. The securing means 16 may be metallic or non-metallic depending upon its compatability with the resinous interlayer. The securing means 16 can also be flexible or non-flexible and formed into a flat plate or bent into any configuration. The critical feature of the invention resides in the securing means does not contact the glass or outer layers when secured in a frame or structural support. The securing means may be metallic, fiberglass, high strength impact resistent plastic, or the like.

FIG. 3 illustrates the laminate glazing unit 10 having a plurality of tabs 22 which are spaced around the periphery of the laminate 10. The laminate 10 is especially useful as a glazing unit for aircraft windows and cockpits. The tabs 22 are intended to be attached to a frame by bolting to the frame at holes 22 in a manner whereby there is no contact of the glass outer members 12, 14 with the frame.

FIGS. 4A and 4B illustrate different forms of securing means 26, 29 which may be utilized in the invention. As seen in FIG. 4A, a tab 26 is shown in T-form which can be embedded into a laminate. The tab 26 is provided with an opening 27 so as to be able to be secured to a frame or building element by a suitable fastening means. The tab 26 has arms 28 which are extended in the interlayer of a laminate to provide a resistance against removal and to prevent delamination.

FIG. 4B shows a tab 27 having an opening 30 for fastening to a frame or the like with a suitable bolt means. The tab 27 has arms 31 with serations 32 which extend over several layers in the interlayer of a laminate so as to provide an additional resistance against removal. However, the tabs and resistance means may take many forms and shapes.

FIG. 5 shows laminate 10 with a plurality of tabs 22 having apertures 23 for fastening to a suitable support. The laminate further includes a bus bar system as disclosed in U.S. Pat. No. 4,029,942, which is incorporated herein by reference, which comprises an electrical receptor 34 having resistive means 36 for heating, defrosting or defogging the laminate. The system has a male electrical pin 40 for insertion into female electrical socket 42. The tabs 22 are provided with resistance means 24 and the receptor 34 has a similar resistance means 38. In lieu of heating means, the resistive means may be an alarm means which indicates a break in the laminate.

In FIG. 6 there is shown the laminate glazing unit 10 of the type shown in FIG. 5 in a frame 44. The laminate 10 is secured to the frame by bolts 45 in the aperatures 23 of the tabs 22. If desired, in order to further seal the glazing unit 10 into the frame 44, the space in the frame may be filled with a high impact strength resin. Suitable resins include epoxy resins, thermosetting phenolic resins, polymers of caprolactam, and the like. U.S. Pat. No. 4,593,070 to Oyama et al and U.S. Pat. No. 593,073 to St. Pierre et al, which are herein incorporated by reference, that disclose suitable resins for use in the present invention.

Figure 7:
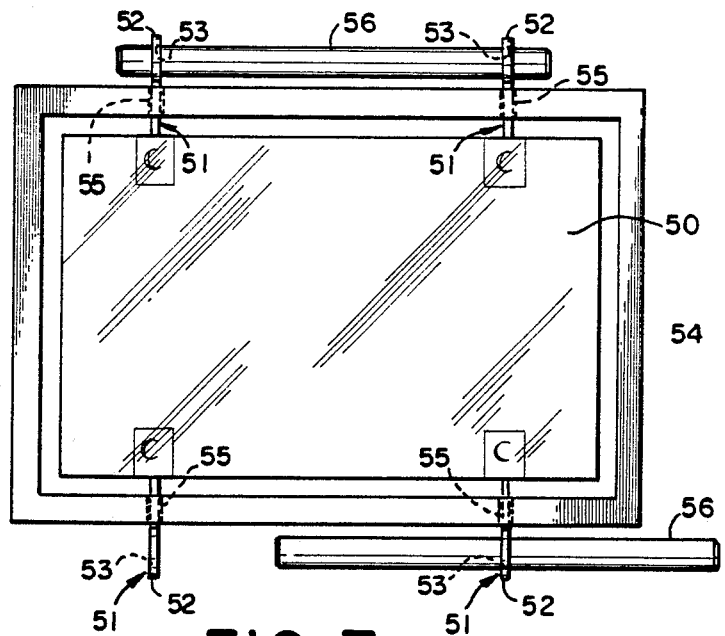
FIG. 7 is a front view of a glazing unit and a supporting gasket of the invention.

FIG. 7 shows a laminate 50 having tabs 51 which are inserted through slots 55 of a gasket 54. The tabs 51 have ring members 52 which protrude from the outside of the gasket 54. The ring members 52 may be aligned adjacent to similar ring members (not through) on a frame or building structure and secured thereto by a latch or rod 56. The tabs 51, as shown, have resistance. However, a resistance means is especially advantageous for use with interlayers other than the ionomer resins disclosed in the aforementioned application Ser. No. 809,847, that is, those resinous interlayers which have poor adhesion to metal.

It is also understood that while the present invention illustrates an interlayer of extruded transparent plastic material, the term "interlayer", as it is contemplated for use of the present invention, may comprise one or more layers of extruded transparent plastic material bonded to one another or made integral to one another with intermediate layers of transparent material of either rigid or flexible nature therebetween. The term "interlayer" as herein contemplated also includes structures comprising rigid plies of coated or uncoated glass or polycarbonate or acrylic or polyester and/or flexible plies of polyurethane, and other esters commonly used as interlayer materials or combinations of rigid and flexible materials within outer plies of extruded transparent plastic material so that the "interlayer" has outer surfaces of extruded transparent plastic material facing a glass surface or a coated glass surface.

Interlayer Materials For Glazing Units

The transparent plastic material of the interlayer of the laminated glazing unit may be the conventional type commonly used as the interlayer of laminated glass windshields which may or may not require the use of adhesive interlayers.

The interlayer may comprise one or more layers of polyurethane, polyvinyl butyral resin, polyethylene terephthalate, commercially available as Du Pont's "MYLAR", polyesters, ionically cross-linked ethylene-methacrylic acid copolymer or ethylene-acrylic acid copolymer which may be neutralized with a polyamine, and the like.

The polyurethanes preferably used according to the principles of the present invention can broadly be described as the reaction product of a polyisocyanate and polyol which upon lamination forms a transparent layer. The polyurethanes may have thermosetting or thermoplastic properties, but preferably exhibit thermoplastic properties. Thus, for example, an organic diisocyanate is reacted with a relatively long chain diol and a curing agent which is usually a monomeric compound having at least two active hydrogens per molecule, as determined by the Zerewitinoff test described in Kohler, J. Am. Chem. Soc., 49, 3181 (1927). Suitable polyisocyanates are organic diisocyanates which include aromatic, aliphatic, cycloaliphatic and heterocylic diisocyanates. Examples are 2,4- and 2,6- toluylene diisocyanate, 1,4-butane diisocyanate, 1,2-isocyanato-methyl cyclobutane, 4,4-methylene-bis(cyclohexyl isocyanate), 1,10-decane diisocyanate, and furfurylidene diisocyanate.

Suitable long chain diols include polyester diols. The polyester diols can be prepared by the polyesterification reaction of an aliphatic dibasic acid or an anhydride thereof with a diol, preferably an aliphatic diol. Suitable aliphatic dicarboxylic acids can be represented by the formula HOOC—R—COOH wherein R is an alkylene radical containing from 2 to 12, and preferably 4 to 8, carbon atoms inclusive, examples of which are adipic, succinic, palmitic, suberic, azelaic and sebacic moieties. Suitable aliphatic diols contain from 2 to 15 carbon atoms, exemplry of which are ethylene glycol, 1,3-propanediol, 1,4-butanediol and 1,6-hexanediol. The average molecular weight of the polyester diol should be between 750 and 5000, preferably between 1000 and 3300. The preferred polyester diol is poly 1,4-butylene) adipate having a molecular weight of about 1800 to 2200.

The ionomer resin which can be used in the invention is obtained by combining a copolymer of ethylene-methacrylic acid or ethylene-acrylic acid and a polyamine which contains at least one R—CH$_2$—NH$_2$ group, and the R may contain: (—CH$_2$NH$_2$)$_x$; or, (R'R"NH)$_y$, where x=1 or more, and y=0 or more. R' and R" may be any organic groups. The preferable structure of the diamine is:

NH$_2$CH$_2$—(R)—CH$_2$NH$_2$ where R contains from one to twenty-five carbon atoms; R may be aliphatic, alicylic or aromatic; and R may also contain:

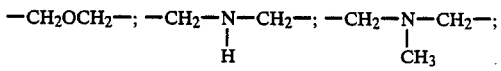

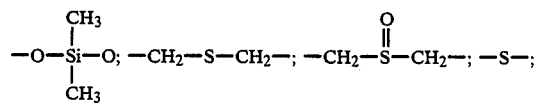

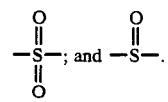

Examples of the diamines which can be used are
1,12-diaminododecane;
1,6-diaminohexane;
Bis (1,3-aminomethyl) cyclohexane (BAC); and
1,3-diaminomethylxylene.

In addition, the copolymer may already be partially neutralized with up to 90% of a metal cation such as sodium or other alkali metal, ammonium salt, zinc or an aluminum salt. A particular example of such a copolymer is "SURLYN" 1601, manufactured by the Polymer Products Department of the DuPont Company.

The outer sheets and/or inner sheets which may be used in the invention may be any well known commercial plate, float or sheet glass composition, polycarbonate resin, fused acrylic/polycarbonate resins, acrylic resins, polyurethanes, ionomer resins, allyl diglycol carbonate resins and the like. The sheets may be coated with an abrasion resistant coating.

Preparation of Laminate

A cross-linked partially neutralized ethylene-acrylic acid ionomer resin was added to the resin port of a small extruder having an extruding barrel temperature which was maintained at 325°–400° F. A film (50–60 mils) was extruded and cut into twelve inch squares, stacked to about one-half inch thickness between one-eighth inch sheets of tempered glass plates. Four flat metal T-shaped tabs were inserted equidistant around the assembly. The assembly was placed in a so-called "polymar" bag of the type disclosed in U.S. Pat. No. 3,311,517 to Keslar et al. The bag comprises an outer ply of polyethylene terephthalate and an inner ply of polyethylene bonded thereto. The bag was inserted into a second bag of the same material, evacuated and sealed. The sealed unit was placed in an antoclave at 255° F. for three minutes under 150–200 psi pressure in a vacuum. The unit was then cooled to room temperature and the pressure reduced. The assembly was removed from the antoclave and the bags and plastic wrapping were removed from the assembly.

The resulting windshield is then ready to insert into a suitable support or frame and secured therein. When secured into a frame or other suitable structure where there is no metal contacting the outer sheets, the tabs will function to distribute impact energy to the structure.

If desired, a bus bar may be inserted prior to antoclaving which contains a resistance means which aids in preventing delamination and removal.

The laminated articles of this invention have utility in a variety of different environments including security installations, armored vehicles, banks, factories, airplanes, space vehicles, submarines, and the like.

The form of the invention shown and described herein represents an illustrative preferred embodiment and variations thereof. It is understood that various changes may be made without departing from the gist of the invention as defined in the claims.

What is claimed is:

1. A transparent laminate adapted for mounting to a support structure by attachment outside its periphery and transferring impact energy to said support structure, said laminate comprising:
   at least two sheets of rigid transparent substrate layers;
   at least one transparent resinous interlayer bonding together said substrate layers, said substrate layers and said interlayer having outside edges defining said laminate periphery, and
   at least one attachment member mounting said laminate on a support structure embedded in said interlayer free of contact with said substrate layers and extending from the periphery of said laminate, said attachment member having means separate from said substrate layers and interlayer securing said laminate to a support in a manner to resist removal, securement means securing said laminate to said support structure and transferring impact energy to the support structure, and
   resistance means on said attachment means within said interlayer aiding in the prevention of removal of said attachment member from the laminate and in preventing delamination.

2. The combination of a support frame and the laminate of claim 1.

3. The laminate of claim 1 wherein said attachment member is a tab spaced around the periphery of said laminate.

4. The laminate of claim 3 wherein said tab is T-shaped.

5. The laminate of claim 4 wherein said tab is provided with serations.

6. The laminate of claim 1 wherein said resistance means comprises at least one protrusion.

7. The laminate of claim 1 wherein said attachment member is provided with aperatures for securing said laminate to said support.

8. The laminate of claim 1 wherein said attachment means is provided with ring-shaped members for securing said laminate to a support with a rod.

9. The laminate of claim 1 wherein at least one of said substrate layers is glass.

10. The laminate of claim 1 wherein at least one of said substrate layers is a plastic material.

11. The laminate of claim 10 wherein said plastic material is selected from the group consisting of polycarbonate, polyurethane and polyvinyl butyral.

12. The laminate of claim 1 wherein said interlayer is polyurethane.

13. The laminate of claim 1 wherein said interlayer is a cross-linked copolymer containing polymerized alpha olefin units and alpha, beta-ethylenically unsaturated carboxylic acid units.

14. The laminate of claim 13 wherein said interlayer is cross-linked with an organic polyamine compound.

15. The laminate of claim 1 including an elastomeric gasket along the periphery of said laminate, said gasket having slots through which said attachment means protrude for attachment to a support.

16. The laminate of claim 1 including a bus bar embedded in said interlayer.

17. A transparent laminate adapted for mounting to a support structure and transferring impact energy to said supporting structure, said laminate comprising at least two sheets of rigid transparent substrate layers, at least one interlayer bonding together said substrate layers comprising an ionomer resin consisting of ionically cross-linked ethylene-methacrylic acid copolymer or ethylene-acrylic acid copolymer which is neutralized with a polyamine, said substrate layers and said interlayers having outside edges defining the laminate periphery, and at least one attachment member mounting said laminate on a support structure embedded in said interlayer free of contact with said substrate layers and extending from the periphery of said laminate securing said laminate to a support, said attachment member having resistance means within said interlayer preventing removal of said attachment member from the laminate and preventing delamination and securement means separate from said substrate layers and interlayer for attaching said laminate to said support structure and transferring impact energy to the support structure in a manner to resist removal.

18. The combination of a support frame and the laminate of claim 17.

* * * * *